United States Patent
Critelli et al.

(10) Patent No.: US 6,698,679 B1
(45) Date of Patent: Mar. 2, 2004

(54) TAPE MEASURE WITH SLIDING TAPE GRIP ELEMENT

(75) Inventors: James M. Critelli, Fuquay-Varina, NC (US); Stephen E. Donelson, Raleigh, NC (US)

(73) Assignee: Cooper Brands, Inc.

( * ) Notice: Subject to any disclaimer, the term of this patent is extended or adjusted under 35 U.S.C. 154(b) by 0 days.

(21) Appl. No.: 10/382,825

(22) Filed: Mar. 6, 2003

(51) Int. Cl.[7] .............................. B65H 75/30; G01B 3/10
(52) U.S. Cl. .................... 242/395; 242/580; 33/758; 33/770
(58) Field of Search ................ 242/395, 395.1, 242/382, 402, 615.3, 615, 388.2, 388.3, 396, 396.1, 579, 580, 586, 586.3; 33/755, 757, 758, 759, 761, 767, 768, 769, 770; 254/134.3 FT

(56) References Cited

U.S. PATENT DOCUMENTS

| | | | |
|---|---|---|---|
| 3,347,487 A | * 10/1967 | Sellen et al. | ............. 242/395.1 |
| 4,164,334 A | * 8/1979 | Rathbun et al. | ............ 242/580 |
| 4,215,828 A | * 8/1980 | Rathbun et al. | ......... 242/395.1 |
| 4,603,481 A | 8/1986 | Cohen et al. | |
| 4,813,625 A | * 3/1989 | Takeda | ...................... 242/395 |
| 5,295,308 A | * 3/1994 | Stevens et al. | ............... 33/770 |
| 5,395,069 A | 3/1995 | Chen | |
| 5,531,395 A | 7/1996 | Hsu | |
| 6,131,844 A | 10/2000 | Hsu | |
| 6,134,801 A | 10/2000 | Miyasaka | |
| 6,224,038 B1 | * 5/2001 | Walsten et al. | ..... 254/134.3 FT |
| 6,464,160 B2 | 10/2002 | Hsu | |
| 6,622,396 B2 | * 9/2003 | Salazar | ........................ 33/758 |

\* cited by examiner

Primary Examiner—William A. Rivera
(74) Attorney, Agent, or Firm—Coats & Bennett, P.L.L.C.

(57) ABSTRACT

A manually wound tape measure includes a housing with a mouth, with the flexible tape extending through the mouth. A resilient grip element is slidably mounted on the tape for movement relative thereto. The grip element includes an internal passage through which the tape extends and is resiliently deformable between an uncompressed state and a compressed state. The exterior of the grip element may be tapered. Manually powered retraction of the tape into the housing causes the grip element to be urged into the mouth portion of the housing such that the grip element is, by interaction with the housing, deformed against and compressively grips the tape. The tape measure may include a manually powered retraction mechanism having a drive ratio of greater than 1:1. The tape measure is manually changeable from a deployed configuration to a retracted configuration wherein the grip element deforms against and compressively grips the tape.

16 Claims, 5 Drawing Sheets

TAPE MEASURE WITH SLIDING TAPE GRIP ELEMENT

BACKGROUND OF THE INVENTION

The present invention is directed generally to manually wound tape measures, and more particularly to manually wound tape measures with a tape grip element that is normally slidable along the tape but grips the tape when the tape is fully retracted.

Modern tape measures may be generally divided into two classes—power return tape measures and manually wound tape measures. The former class typically include a metallic tape blade of not more than forty feet in length and a spring-based mechanism that acts to retract the tape blade into the tape measure housing unless a tape lock is engaged. In contrast, the latter class typically use flexible fabric, fiberglass, and/or plastic tapes of fifty feet or more in length and do not include a powered return mechanism. Instead, the manually wound tape measures rely on some form of manually operated crank mechanism to rewind the tape into the tape measure housing. These manually wound tape measures are typically used for measuring long relatively distances, such as complete foundation walls, vehicle accident scenes, property lines, etc.

One problem with manually wound tape measures is preventing unintended play-out of the tape blade. For instance, when the manually wound tape measure is carried by a user over long distances, the manually wound tape measure typically swings back and forth at the end of the user's arm. This swinging motion has the tendency to cause the tape to play out slightly, on the order of six to twelve inches. With this much tape played out, the end of the tape may whip back and forth, and may strike the user or snag on nearby objects. Both results are obviously undesirable. To counter this, many manually wound tape measures use a complex locking crank mechanism that acts to prevent play out of the tape when the crank is in the "lock" position. While such locking crank mechanisms are somewhat effective, their effectiveness drops off significantly when the crank drive ratio (number of turns of tape take-up reel per turn of crank) is higher than 1:1. For instance, a manually wound tape measure with the approximately 3.75:1 drive ratio of the crank mechanism described in U.S. Pat. No. 4,813,625 is more likely to unintentionally play out tape than a traditional manually wound tape measure with 1:1 drive ratio retraction mechanism. Recognition of this problem has led to the use of even more complex drive/brake mechanisms, such as that disclosed in U.S. Pat. No. 6,134,801, with the necessarily accompanying higher manufacturing costs. As such, none of the prior art solutions have proven completely satisfactory.

Thus, there remains a need for alternative designs of manually wound tape measures that address the problem of unintended play out while remaining simple to manufacture.

SUMMARY OF THE INVENTION

One aspect of the present invention is directed to a manually wound tape measure that has a housing having a mouth portion. A flexible tape extends through the mouth portion, with the tape having an anchored end mated to the housing and a free end manually displaceable with respect thereto. A hook may be attached to this free end of the tape. A grip element is slidably mounted on the tape for movement relative thereto. The grip element includes an internal passage through which the tape extends and is resiliently deformable between an uncompressed state and a compressed state. Manually powered retraction of the tape into the housing causes the grip element to be urged into the mouth portion of the housing such that the grip element is, by interaction with the housing, deformed against and compressively grips the tape. For instance, the internal passage of the grip element may have a first cross-sectional size larger than the tape in the uncompressed state, and at least a portion of the passage may assume a second cross-sectional size smaller than the first cross-sectional size when the grip element is deformed against and compressively grips the tape. Preferably, the tape measure further includes a manually powered retraction mechanism having a drive ratio of greater than 1:1.

In some embodiments, the grip element may be made from a clear material, have a length of at least 1.25 inches, and/or have a hardness of about 50 to about 65 on the Shore A scale. Preferably, the exterior of the grip element is tapered. The grip element may have a central area larger in external cross-section than side portions thereof in the uncompressed state. Likewise, the grip element may include a plurality of external ridges, including a central ridge in the central area and side ridges in the side portions. The tape may optionally include a reinforcing strip applied over the free end of the tape, with the internal passage of the grip element sized to allow the reinforcing strip to slidably fit therein in the uncompressed state.

Another aspect of the invention is directed to a manually wound tape measure that is manually changeable from a deployed configuration wherein the free end of the tape is disposed remote from the housing, the grip element is in the uncompressed state, and the grip element is slidable along the tape to a retracted configuration wherein the tape is retracted, the grip element is at least partially disposed within the mouth, and the grip element is in the compressed state with the grip element deformed against and compressively gripping the tape. such a tape measure advantageously includes a manually operable crank mechanism operable to change the tape measure from the deployed configuration to the retracted configuration.

One method of operating a manually wound tape measure according to the present invention includes retracting a free end of a flexible measuring tape towards a housing via a manually powered retraction mechanism having a drive ratio of greater than 1:1; the housing having a mouth portion and the tape extending through a grip element resiliently deformable between an uncompressed state and a compressed state; sliding the tape through a passage in the grip element during the retracting; engaging the grip element by the mouth portion; compressing the grip element, by the housing, such that the grip element is deformed against and compressively grips the tape; and thereafter, holding the free end proximate the mouth via the grip element with the grip element in the compressed state. The process may continue with thereafter deploying the tape, the deploying comprising pulling the free end away from the housing and thereby causing the grip element to assume the uncompressed state, wherein the tape is slidable relative to the tape when the grip element is in the uncompressed state.

The present invention may include one or more of the aspects discussed above.

DETAILED DESCRIPTION OF THE INVENTION

Figure 1:
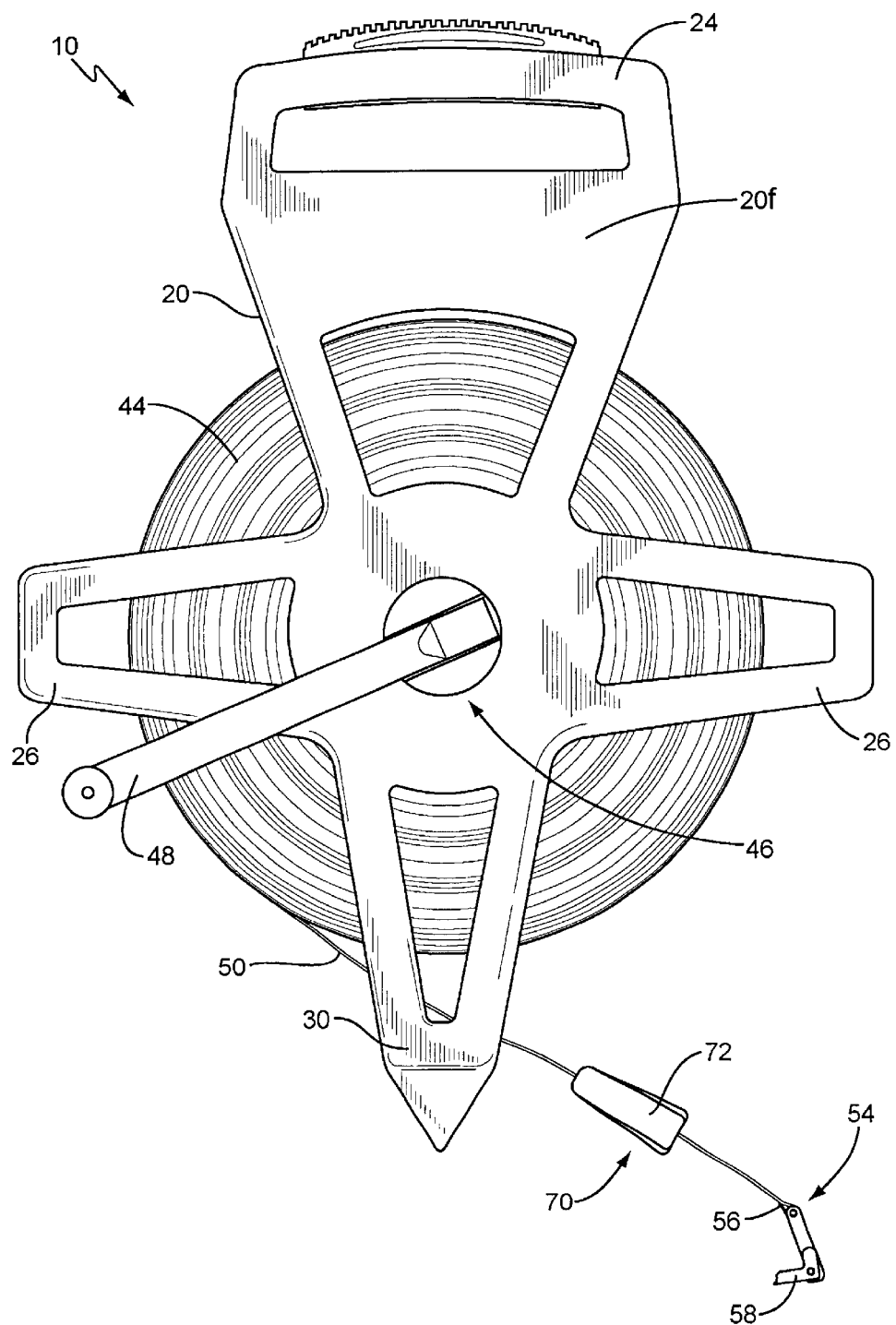
FIG. 1 is a side view of one tape measure embodiment constructed in accordance with the present invention.
Figure 2:
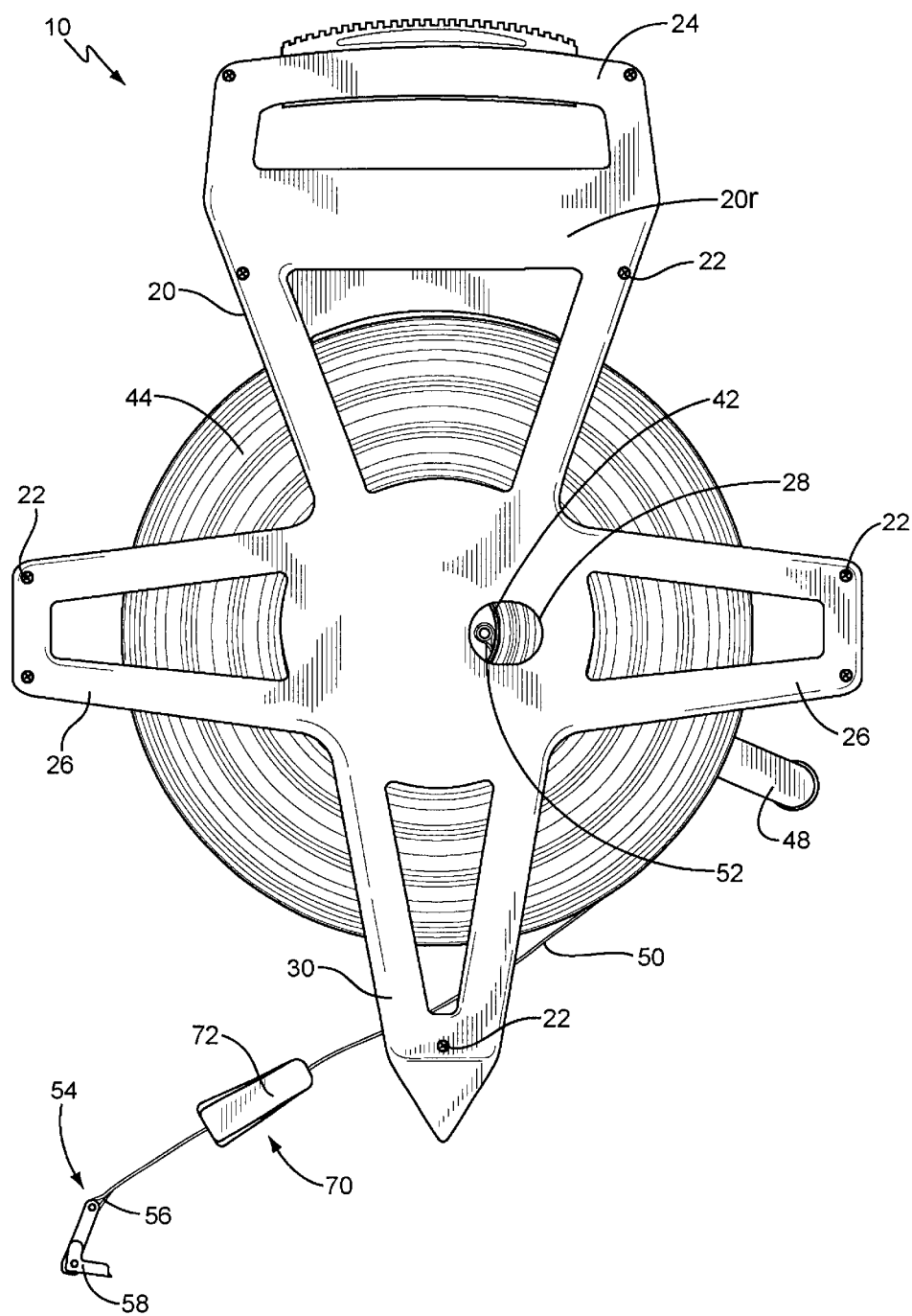
FIG. 2 is an opposite side view of the tape measure of FIG. 1.
Figure 3:
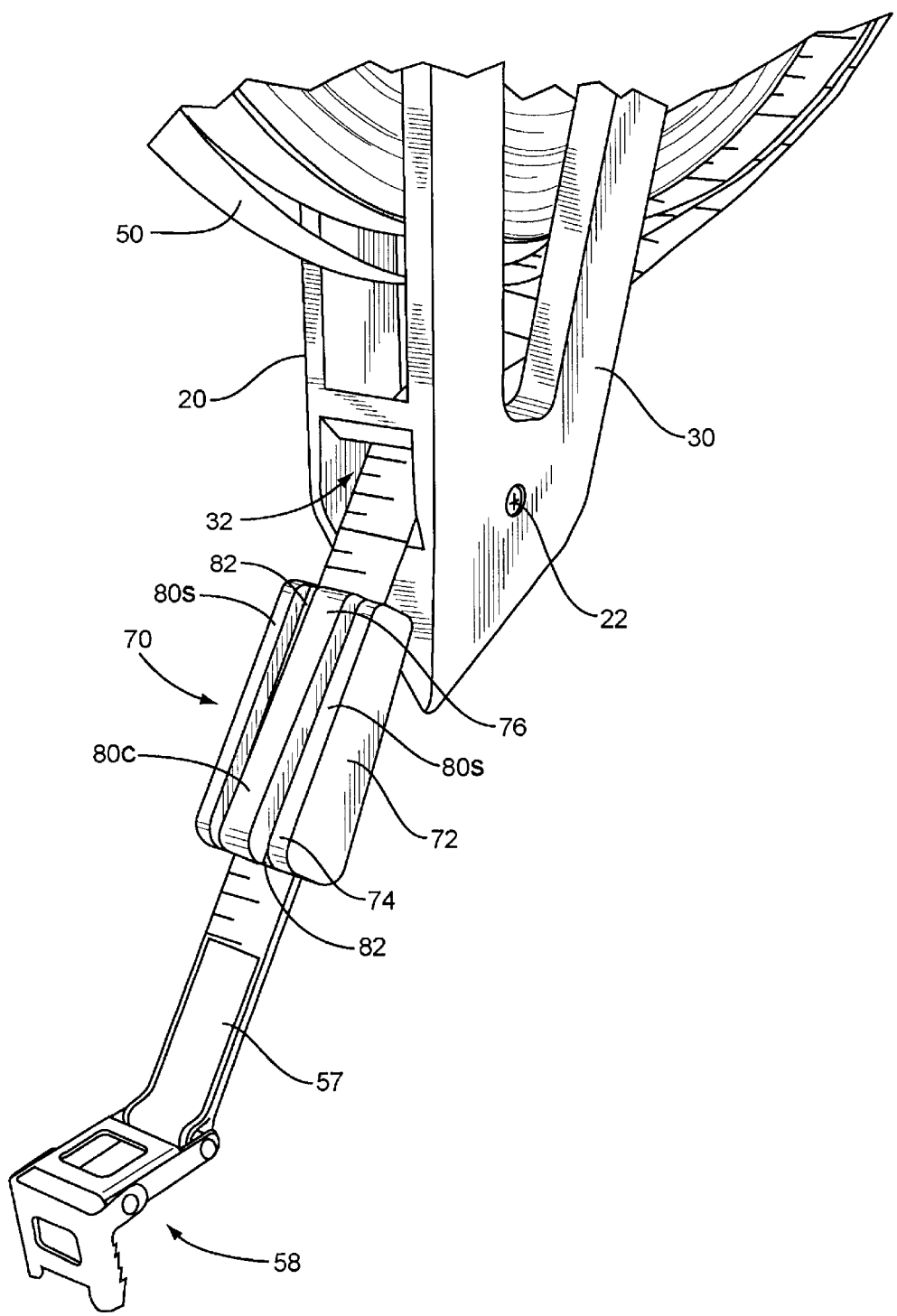
FIG. 3 is a partial perspective view of the tape measure of FIG. 1.

As illustrated in FIG. 1, a manually wound tape measure, generally designated 10, is shown constructed according to the present invention. The tape measure 10 includes a housing 20, a tape 50, and a grip element 70. The housing 20 is typically formed by a front housing portion 20f and a rear housing portion 20r held together by screws 22, snap-fit connections, or any other method known in the art. The housing 20 preferably has an open-frame type appearance, as shown in the Figures, with a handle 24, left and right arms 26, and a lower arm 30. The housing also includes a tape reel 42 that is rotatably supported in the middle of the housing 20. The tape reel 42 generally takes the form of cylindrical portion that fits between the front and rear housing portions 20f, 20r and is mounted for rotation relative thereto in a conventional fashion. Preferably, the rear housing portion 20r includes an aperture 28 for accessing the tape reel 42 so as to anchor one end 52 of the tape 50 thereto. The housing 20 also includes a crank mechanism 46. The crank mechanism 46 extends through the front housing 20f and connects to the tape reel 42. The crank mechanism 46 includes a crank 48 and various gears (not shown) for causing the tape reel 42 to rotate when the crank 48 is turned. The crank mechanism 46 may, if desired, take the form of the greater than 1:1 ratio gear mechanism described in either U.S. Pat. No. 6,464,160 or U.S. Pat. No. 4,813,625, both of which are incorporated herein by reference. Of course, other greater than 1:1 ratio gear mechanisms may be used, such as ones with three planetary gears, etc. It should be noted that the particular details of crank mechanism 46 employed are not important to understanding the present invention.

The tape 50 is generally wound on the tape reel 42 in the form of a volute coil 44. One end of the tape 50, the anchor end 52, is anchored to the tape reel 42 in any conventional fashion. The opposing end of the tape 50, the free end 54, is routed out of the housing 20 at the mouth opening 32 located in the lower arm 30. The tape free end 54 includes a hook 58, of any type known in the art, for attaching to an object so as to allow a single person to readily take measurements. For instance, the hook 58 may take the form of the approximately one inch long hinged hook presently found on LUFKIN Series 1700 brand tape measures available from Cooper Tools of Raleigh, N.C. Typically, the hook 58 attaches to the tape 50 via a loop 56 formed in the end of the tape 50. This loop 56 is preferably reinforced by a suitable flexible reinforcing strip 57 that extends from a point about 1½ inches back from the loop 56 on the top (marked) side of the tape 50 to a point about 3½ inches back from the loop 56 on the underside of the tape 50. The reinforcing strip 57 may advantageously be made from an approximately 0.070 inch thick flexible vinyl material, with or without the external ribbing.

The aspects of the construction of the tape measure 10 discussed in the preceding two paragraphs are substantially similar to the currently available LUFKIN Series 1700 brand tape measures available from Cooper Tools of Raleigh, N.C. However, the tape measure 10 of the present invention differs from the Series 1700 tape measures 10 in at least two important aspects—the presence of a movable grip element 70 and the configuration of the mouth opening 32 on the housing 20.

Figure 4:
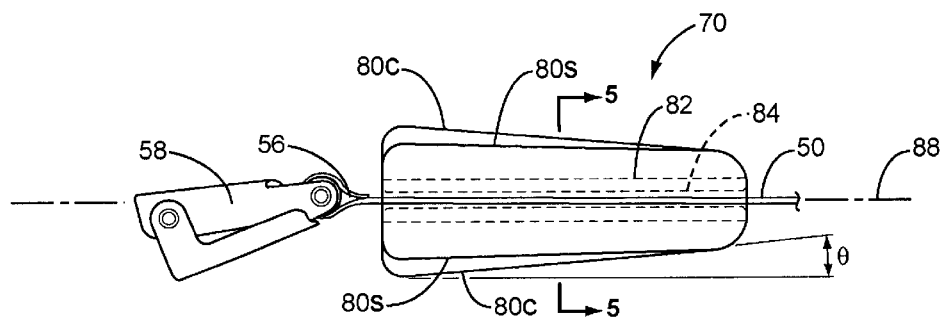
FIG. 4 is a side view of the grip element of the tape measure of FIG. 1.

First, the tape measure 10 of the present invention includes a grip element 70 that is normally slidably disposed on the tape 50. This grip element 70 is shown in more detail in FIGS. 4–6. The grip element 70 includes a body 72 that has an external cross-section that tapers down from its distal portion 74 to its proximal portion 76 on one or both of its top and bottom sides and is preferably $\geq 1\frac{1}{4}$ inches long, and more preferably approximately 1¾ inches long. The taper angle $\Theta$ may advantageously be in the range of 7° to 15°. The body 72 may include external ridges 80 on its upper and lower sides, with grooves 82 in-between, that help form the taper if desired. If so, then the central ridge 80c may advantageously be more tapered than the side ridges 80s, such that the ridges 80c, 80s have the same height towards the proximal portion 76, but the central ridge 80c is taller towards the distal portion 74. In addition, the central ridge 80c may advantageously have a width that this approximately twice the width of the side ridges 80s. The ridges 80 preferably include rounded corners at their respective distal and proximal ends. The grip element 70 also includes a slot-type passage 84 that extends from one end to the other along the longitudinal axis 88 of grip element 70. The passage 84 is sized to accept the tape 50 without binding when the grip element 70 is in its uncompressed state, such that the grip element 70 may easily slide along the tape 50 (including the portion of the tape 50 having the reinforcing strip 57 thereon). The passage 84 may advantageously have a slight top-to-bottom taper (e.g., 1°) running in the same direction as the external taper of the grip element 70. The grip element 70 is made from a resiliently deformable material, generically referred to herein as "elastomeric." The elastomeric material of the grip element 70 is intended to allow the grip element 70 to be slightly deformed, as described below, but still return to its "normal" shape when the deforming forces are removed. The material of the grip element 70 may advantageously be clear to allow the markings on the portion of the tape 50 in the passage 84 to be seen.

As noted above, the tape 50 is routed out of the housing 20 via the mouth 32. The mouth 32 is located on the lower arm 30 and is essentially a deep generally rectangular opening through which the tape 50 extends. The cross-sectional size of the mouth 32 should to correspond to the grip element 70, preferably at a point approximately ⅓ of the way from the proximate end of the grip element 70 to the distal end of the grip element 70. As such, only a portion of the grip element 70 can fit thorough the mouth 32 before becoming too big to fit through the mouth 32 without being compressed. The mouth 32 should be at least deep enough to accept the grip element 70 until it is firmly gripped, see below. For example, the mouth 32 may have a depth of approximately one-half the length of the grip element 70. Further, the mouth 32 should be oriented to allow the grip element 70 to be generally aligned with a line running tangential to the tape coil 44 when the tape is fully retracted. In addition, the mouth 32 may advantageously be rounded, chamfered, and/or smoothed at its outermost portion, to allow for easy insertion of the grip element 70 as discussed further below.

In operation, the grip element 70 acts to grip the tape 50 when the tape 50 is fully retracted. When the tape 50 is rewound from a deployed configuration, the tape 50 is wound back onto its coil 44, following a path that goes through the passage 84 of the grip element 70 and the mouth 32. As the grip element 70 is in its uncompressed state, the tape 50 should be able to slide through the grip element rather easily (see FIG. 5). Of course, incidental friction between the tape 50 and the grip element 70 may cause the grip element 70 to be pulled back into light contact with the mouth 32. However, the tape 50 should still move readily through the grip element 70, as the relatively light friction, due to the relative sizes of the tape 50 and the passage 84, should not force the grip element 70 into firm contact with the mouth 32. When the tape 50 is rewound to the point that the hook 58 is pulled against the grip element 70, the tape 50 will pull firmly against the grip element 70 as the hook 58 is too large to fit in the passage 84. The pull of the tape 50 causes the proximal portion 76 of the grip element 70 to be pulled firmly into contact with the mouth 32. The initial contact is along the center ridge 80c, with the side ridges 80s mainly acting to help keep the grip element 70 aligned in the mouth 32. While the mouth 32 is sized to accept the proximal end of the grip element 70, the taper of the grip element 70 causes the relatively hard material forming the mouth 32 to press against the center ridge 80c, with increasing force as the grip element 70 is pulled farther into the mouth 32. In response to this force, the grip element 70 elastically deforms to a compressed state. Because the force is being applied primarily along the center ridge 80c, the deformation primarily results in the center "roof" and "floor" of the passage 84 being forced inward such that the tape 50 becomes gripped by the grip element 70 (see FIG. 6). Note that the force application is generally perpendicular to the marked face of the tape 50 (generally parallel to the tape's thin dimension). Thus, the retraction of the tape 50 into the housing 20 causes the grip element 70 to be urged into the mouth 32 of the housing 20 (such as by interaction with the hook 58) such that the grip element 70 is deformed against and compressively grips the tape 50. As will be appreciated, the grip element 70 may directly grip the main material of the tape 50, or may grip the tape 50 by engaging against a sub-component of the tape, such as the optional reinforcing strip 57; all of these arrangements are such that the grip element 70 "grips", or is "gripping," the tape 50. Further, it should be noted that the frictional and compressive forces between the grip element 70 and the mouth 32 cause the grip element 70 to be held in place relative to the housing 20, even when the tape measure 10 is swung back and forth.

Figure 5:
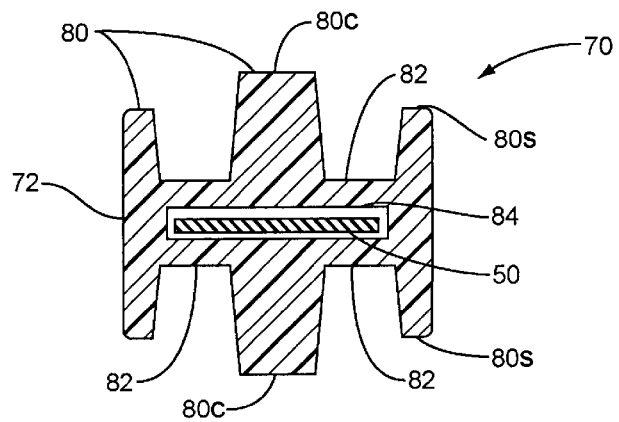
FIG. 5 is a front sectional view of the grip element of FIG. 4 in the uncompressed state along line 5—5 with a tape shown in the passage.
Figure 6:
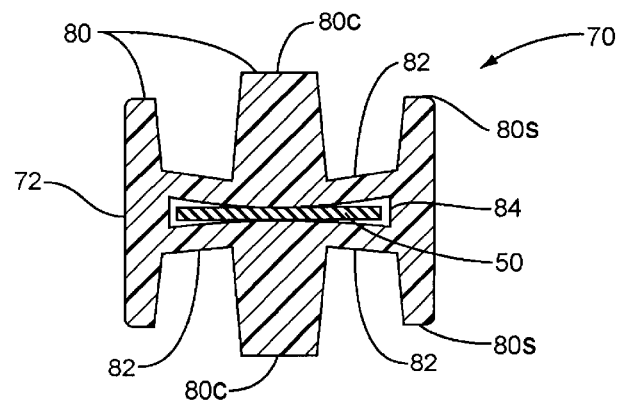
FIG. 6 is a front sectional view of the grip element of FIG. 4 in the compressed state along line 5—5 with a tape shown in the passage.

When the user wants to use the tape measure 10, the user simply releases the crank mechanism 46 from a "lock" setting if required, and then pulls outward on the tape 50 in the usual fashion. Pulling out the tape 50 should cause the grip element 70 to be pulled out, at least slightly, from its tight fit in the mouth 32, thereby allowing the grip element 70 to resiliently return to its uncompressed state (FIG. 5). As noted above, when the grip element 70 is in its uncompressed state, the tape 50 is able to slide within the passage 84, thereby allowing the tape 50 to be played out with little or no additional effort. This arrangement (tape 50 played out, grip element 70 uncompressed and slidable along tape 50) may be referred to as the deployed configuration of the tape measure 10.

The assembly process for of the tape measure 10 of the present invention is substantially the same as with the prior art manually wound tape measures, with the additional step that the anchor end 52 of tape 50 should be fed through the passage 84 of the grip element 70 before the anchor end 52 is attached to the tape reel 42. The tape 50 may then be wound into coil 44 around tape reel 42 on a suitable winding machine, with the tape 50 being wound through the grip element 70. Alternatively, if it is desired to add hook 58 to the free end 54 of tape after winding, then the free end 54 may be fed through the passage 84 before the hook 58 is attached. In another alternative, the grip element 70 in some embodiments may be formed with living hinge or other means of opening such that the tape 50 may be inserted into the passage 84 laterally (rather than along axis 88) at any point in the assembly process. However, care should be taken to ensure that such "openable" grip elements 70 do not inadvertently open, and fall off the tape 50, during tape retraction.

As with the prior art manually wound tape measures, the housing 20 is preferably made from a suitably strong material such as high impact ABS, with the tape 50 being a nylon overcoated woven fiberglass material, and a metallic hook. As pointed out above, the grip element 70 material should be a relatively soft elastomeric material with a finished durometer of 50–65 Shore A, and preferably approximately 55 Shore A. Suitable materials include PVC, nylon, and the like.

It should be noted that the that the grip element 70 is captured by the mouth 32 and held in place by a combination of the outwardly acting spring force of the compressed grip element 70 and surface friction. However, some embodiments of the tape measure 10 may also include a small bump on the grip element 70 and a corresponding recess on the mouth 32, or vice-versa, that interact as a detent mechanism to further aid in the retention of the grip element 70 when the tape is fully retracted.

Figure 7:
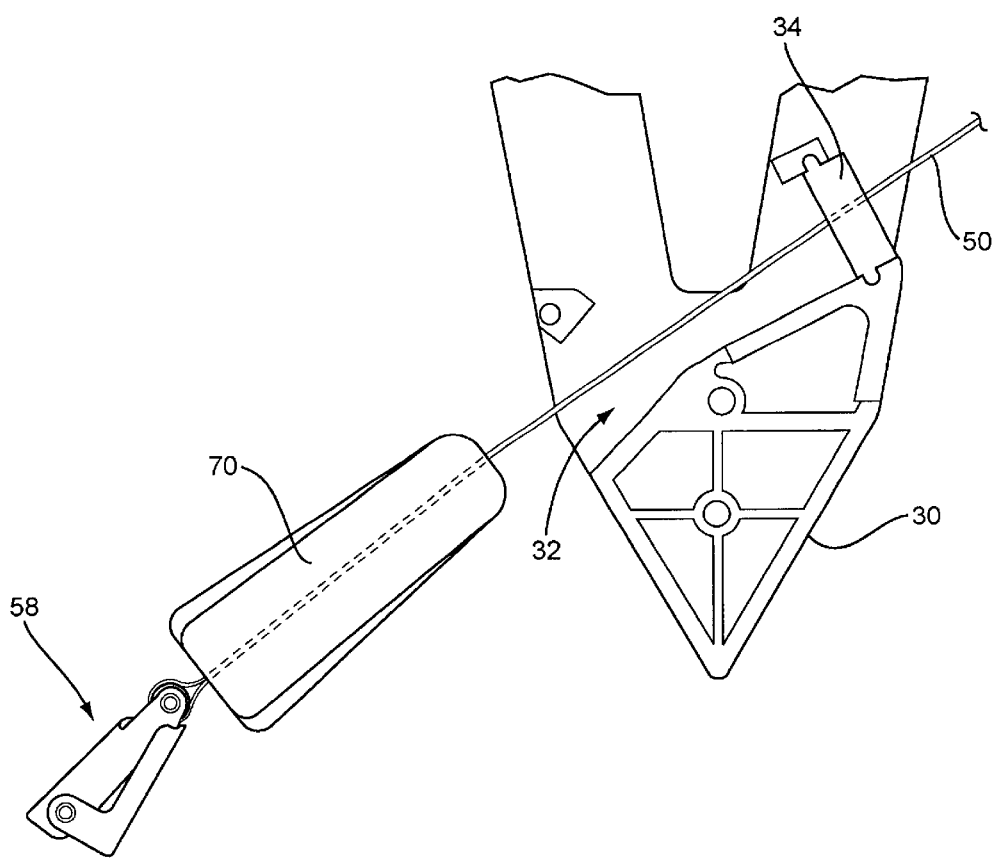
FIG. 7 shows the path of the tape through a portion of the housing including the optional tape guide structure.

If desired, the lower arm 30 may include a tape guide structure 34 upstream of the mouth 32, see FIG. 7. The optional tape guide structure 34 helps define the path of the tape 50 as it is played out and retracted, and is preferably disposed so that the path of tape 50 is aligned with axis 88 when the grip element 70 is held in mouth 32. The tape guide structure 34 may be integrally formed with the housing 20, or may a separate piece that is mounted thereto. For example, the tape guide structure 34 may take the form of two simple posts, with the tape 50 routed therebetween, or the tape guide structure 34 may be more elaborate, such as that currently found on LUFKIN Series 1700 brand tape measures, for example model number 1709, available from Cooper Tools of Raleigh, N.C. It should be noted that the particular details of the tape guide structure 34 selected are unimportant to understanding the present invention, and may be based on manufacturing considerations.

The use of the resilient grip element 70 in the tape measure 10 of the present invention helps prevent inadvertent play out of the tape 50 when the tape is fully retracted. By vertically compressing the walls of passage 84 against the tape 50, due to the interaction of the tapered central ridge 80c and the mouth 32 when the grip element 70 is firmly pulled into the mouth 32, the grip element helps retain the tape in the retracted position. However, once the compression on the grip element 70 is released, the tape is free to move within passage 84, thereby avoiding undesirable drag during deployment of the tape 50. In addition, the presence and action of grip element 70 helps to prevent damage to the reinforcing strip 57 (if present) and/or the tape 50.

It should be noted that references to manually powered retraction mechanisms and/or manually powered retraction, both above and in the claims, are intended to refer to retraction mechanisms and methods that do not rely on electric or spring-based potential energy to retract the tape 50, but instead rely on human power to retract/recoil the tape 50.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A manually wound tape measure, comprising:
   a housing having a mouth portion;
   a flexible tape extending through said mouth portion, said tape having an anchored end and a free end, said free end manually displaceable with respect to said housing;
   a hook attached to said free end of said tape;
   a grip element slidably mounted on said tape between said hook and said housing and resiliently deformable between an uncompressed state and a compressed state, said grip element including an internal passage through which said tape extends;
   wherein manually powered retraction of said tape into said housing causes said grip element to be urged into said mouth portion of said housing such that said grip element is, by interaction with said housing, deformed against and compressively grips said tape.

2. The tape measure of claim 1 wherein said grip element is made from a clear material.

3. The tape measure of claim 1 wherein said grip element has a length of at least 1.25 inches.

4. The tape measure of claim 1 wherein an exterior of said grip element is tapered.

5. The tape measure of claim 1 wherein said grip element has a hardness of about 50 to about 65 on the Shore A scale.

6. The tape measure of claim 1 wherein said internal passage of said grip element has a first cross-sectional size larger than said tape in said uncompressed state.

7. The tape measure of claim 6 wherein at least a portion of said passage assumes a second cross-sectional size smaller than said first cross-sectional size when said grip element is deformed against and compressively grips said tape.

8. The tape measure of claim 1 wherein said grip element has a central area larger in external cross-section than side portions thereof in said uncompressed state.

9. The tape measure of claim 8 wherein said grip element includes a plurality of external ridges, including a central ridge in said central area and side ridges in said side portions.

10. The tape measure of claim 1 wherein said tape measure further includes a manually powered retraction mechanism having a drive ratio of greater than 1:1.

11. The tape measure of claim 1 wherein said tape further includes a reinforcing strip applied over said free end.

12. The tape measure of claim 1 wherein:
   an exterior of said grip element is tapered and includes a central area larger in external cross-section than side portions thereof in said uncompressed state;
   said grip element has a hardness of about 50 to about 65 on the Shore A scale; and
   said tape measure further includes a manually powered retraction mechanism having a drive ratio of greater than 1:1.

13. A manually wound tape measure, comprising:
   a housing having a mouth portion;
   a flexible tape supported by said housing and extending through said mouth portion, said tape having an anchored end and a free end, said free end manually displaceable with respect to said housing;
   a grip element slidably mounted on said tape, said grip element including an internal passage through which said tape extends and resiliently deformable between an uncompressed state and a compressed state; and
   said tape measure manually changeable from a deployed configuration wherein said free end of said tape is disposed remote from said housing, said grip element is in said uncompressed state, and said grip element is slidable along said tape to a retracted configuration wherein said tape is retracted, said grip element is at least partially disposed within said mouth, and said grip element is in said compressed state with said grip element deformed against and compressively gripping said tape.

14. The tape measure of claim 13 further including a manually operable crank mechanism operable to change said tape measure from said deployed configuration to said retracted configuration.

15. A method of operating a manually wound tape measure, comprising:
   retracting a free end of a flexible measuring tape towards a housing via a manually powered retraction mechanism having a drive ratio of greater than 1:1; said housing having a mouth portion, said tape extending through a grip element resiliently deformable between an uncompressed state and a compressed state;
   sliding said tape through a passage in said grip element during said retracting;
   engaging said grip element by said mouth portion;
   compressing said grip element, by said housing, such that said grip element is deformed against and compressively grips said tape; and
   thereafter, holding said free end proximate said mouth via said grip element with said grip element in said compressed state.

16. The method of claim 1 further comprising thereafter deploying said tape, said deploying comprising pulling said free end away from said housing and thereby causing said grip element to assume said uncompressed state, wherein said tape is slidable relative to said tape when said grip element is in said uncompressed state.

* * * * *